(12) United States Patent
Takahashi

(10) Patent No.: US 11,458,844 B2
(45) Date of Patent: Oct. 4, 2022

(54) POWER SUPPLY SYSTEM FOR VEHICLE

(71) Applicant: HONDA MOTOR CO., LTD., Tokyo (JP)

(72) Inventor: Masaya Takahashi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 410 days.

(21) Appl. No.: 16/712,225

(22) Filed: Dec. 12, 2019

(65) Prior Publication Data

US 2020/0189395 A1 Jun. 18, 2020

(30) Foreign Application Priority Data

Dec. 14, 2018 (JP) .............................. JP2018-234522

(51) Int. Cl.
*B60L 3/00* (2019.01)

(52) U.S. Cl.
CPC ........... *B60L 3/0061* (2013.01); *B60L 3/0046* (2013.01); *B60L 2210/12* (2013.01)

(58) Field of Classification Search
CPC ... B60L 3/0061; B60L 3/0046; B60L 2210/12
USPC ......................................................... 701/22
See application file for complete search history.

(56) References Cited

U.S. PATENT DOCUMENTS

| | | | |
|---|---|---|---|
| 10,183,555 B2* | 1/2019 | Sakai | B60L 3/0023 |
| 10,245,956 B2 | 4/2019 | Minesawa | |
| 2007/0029986 A1* | 2/2007 | Nakamura | B60L 50/16 |
| | | | 323/318 |
| 2020/0189395 A1* | 6/2020 | Takahashi | B60L 3/0061 |

FOREIGN PATENT DOCUMENTS

| | | |
|---|---|---|
| JP | 2015-019561 A | 1/2015 |
| JP | 2015-073353 A | 4/2015 |
| JP | 2015-100241 A | 5/2015 |
| JP | 2016-052140 A | 4/2016 |
| JP | 2016-52140 A | 4/2016 |
| JP | 2017-189059 A | 10/2017 |

OTHER PUBLICATIONS

Office Action dated Jul. 21, 2020, issued in counterpart JP Application No. 2018-234522, with Englsih translation (8 pages).

* cited by examiner

*Primary Examiner* — Gertrude Arthur Jeanglaude
(74) *Attorney, Agent, or Firm* — WHDA, LLP

(57) ABSTRACT

A power supply system includes a high voltage circuit; a system ECU that controls the high voltage circuit; and a backup power supply unit that supplies electric power in the high voltage circuit to the system ECU. The system ECU includes a discharge controller that performs discharge control to discharge the electric charges in a smoothing capacitor until a secondary-side voltage is reduced to a discharge termination determination voltage or lower; and a vehicle state monitor that determines whether a vehicle is in a stopped state, and determines whether the secondary-side voltage is lower than or equal to a re-rise determination voltage in a monitoring period from termination of the discharge control until the vehicle is determined to be in the stopped state. When the secondary-side voltage is determined to be higher than the re-rise determination voltage by the vehicle state monitor, the discharge controller performs the discharge control again.

11 Claims, 8 Drawing Sheets

POWER SUPPLY SYSTEM FOR VEHICLE

CROSS REFERENCES TO RELATED APPLICATIONS

The present application claims priority under 35 U.S.C. § 119 to Japanese Patent Application No. 2018-234522, filed Dec. 14, 2018, entitled "Power Supply System for Vehicle." The contents of this application are incorporated herein by reference in their entirety.

BACKGROUND

1. Field

The present disclosure relates to a power supply system for a vehicle. More specifically, the present disclosure relates to a power supply system for a vehicle that, when a discharge start condition is met, performs discharge control to discharge charges in a main circuit which connects an electricity storage device and an electric motor generator.

2. Description of the Related Art

In an electric vehicle such as a hybrid automobile and an electric automobile, a power supply system is mounted, and the electric vehicle runs by driving a motor using the electric power supplied from the power supply system. The power supply system includes a high voltage battery, a DCDC converter that converts an output voltage of the high voltage battery, and an inverter that converts a DC output of the DCDC converter to AC and supplies the AC to the motor. In addition, a high voltage circuit including the DCDC converter and the inverter is provided with multiple high capacitance smoothing capacitors.

While a vehicle is running, electric charges need to be stored in the above-mentioned multiple smoothing capacitors in order to stabilize the DC power of the power supply system. However, when a vehicle is in collision for instance, the electric charges stored in these smoothing capacitors should be discharged quickly. Thus, in many vehicles, when a collision occurs, discharge control is performed to discharge the electric charges stored in the smoothing capacitors to some loads and reduce the voltage of the high voltage circuit quickly (see, for instance, Japanese Unexamined Patent Application Publication No. 2016-52140).

A vehicle unable to run due to a collision may be moved by a towing truck. In this situation, when drive wheels are rotated by the towing truck, inductive power is generated in the motor, and the voltage of the high voltage circuit may rise again. The technique disclosed by Japanese Unexamined Patent Application Publication No. 2016-52140 assumes such a situation, and when the inductive voltage of the motor exceeds a predetermined threshold, discharge control is performed to cause a discharge resistor to consume the electric charges of the capacitors.

The technique disclosed by Japanese Unexamined Patent Application Publication No. 2016-52140 assumes an event which occurs at the time of towing of a vehicle, in other words, after a vehicle is involved in a collision and stopped, a certain time (at least several minutes or longer) elapses until a towing truck arrives. However, the event that the voltage of the high voltage circuit rises again during the period after execution of discharge control at the time of collision of the vehicle until the vehicle is stopped may occur immediately after the first discharge control is performed. For instance, when a vehicle is involved in a collision on a slope or involved in an oblique collision, inductive power is generated in the motor by continuous running of the vehicle and rotation of the drive wheels, and re-rise of the voltage mentioned above may occur during the period after execution of the first discharge control until the vehicle is stopped. However, in the technique disclosed by Japanese Unexamined Patent Application Publication No. 2016-52140, re-rise of the voltage immediately after the discharge control is not discussed sufficiently.

SUMMARY

The present application describes a power supply system for a vehicle that, even when the voltage of the main circuit rises again during the period after execution of the first discharge control until the vehicle is stopped, can perform the discharge control again. The disclosure includes the following embodiments.

(1) A power supply system (for instance, the later-described power supply system 1) for a vehicle (for instance, the later-described vehicle V) according to the present disclosure includes: an electricity storage device (for instance, the later-described high voltage battery 21); an electric power generator (for instance, the later-described drive motor M) coupled to drive wheels (for instance, the later-described drive wheels W) of the vehicle; a main circuit (for instance, the later-described high voltage circuit 2) that connects the electricity storage device and the electric power generator, and transfers electric power between the electricity storage device and the electric power generator; a control device (for instance, the later-described system ECU 8 and control circuit 25d) that controls the electric power generator and the main circuit; a main circuit voltage sensor (for instance, the later-described secondary-side voltage sensor 94) that detects a main circuit voltage which is a voltage of the main circuit; and a main power supply (for instance, the later-described low voltage battery 31) that supplies electric power to the control device. The control device includes: a discharge controller (for instance, the later-described discharge controller 85) that, when a discharge start condition is met, performs first discharge control (for instance, the later-described first discharge control executed between time t2 and time t3 of FIG. 8) to discharge electric charges in the main circuit, and reduce the main circuit voltage; and a monitor (for instance, the later-described vehicle state monitor 86) that determines whether the vehicle is in a stopped state, and monitors the main circuit voltage in a monitoring period from termination of the first discharge control until the vehicle is determined to be in the stopped state. When rise of the main circuit voltage is detected by the monitor, the discharge controller performs second discharge control (for instance, the later-described second discharge control executed between time t7 and time t8 of FIG. 8) to discharge the electric charges in the main circuit, and reduce the main circuit voltage. Thus, when the main circuit voltage rises again for some reason in the period from the first discharge control at the time of a collision until the vehicle assumes a stopped state, the second discharge control is performed again accordingly. Consequently, in the present disclosure, even when the main circuit voltage rises again in the period from the first discharge control immediately after a collision of the vehicle until the vehicle assumes a stopped state, the second discharge control can be executed again.

(2) In this case, it is preferable that the power supply system for a vehicle include a sub-electric power supply device that, when electric power is unable to be supplied from the main power supply to the control device, supplies electric power to the control device. When the vehicle is in collision, a power line that connects the main power supply and the control device may be broken or a failure may occur in the main power supply. In that case, there is a possibility that sufficient electric power cannot be supplied to the control device continuously, the control device cannot monitor the main circuit voltage continuously over a sufficient monitoring period, and when rise of the main circuit voltage is detected, the discharge control cannot be performed again. However, the power supply system in the present disclosure includes the above-described sub-electric power supply device via which electric power is supplied from the main circuit which has a high voltage due to a collision to the control device which has lost the main power supply, thus even after the first discharge control is performed, the main circuit voltage can be monitored continuously by the monitor over the monitoring period, and when the main circuit voltage rises again, the second discharge control can be performed again, thus the main circuit voltage which has risen again can be reduced.

(3) In this case, it is preferable that the sub-electric power supply device include a sub-power supply circuit (for instance, the later-described backup power supply unit 5) that connects the main circuit and the control device, and when electric power is unable to be supplied from the main power supply to the control device, supplies electric power in the main circuit to the control device. Thus, in the control device, the discharge control can be performed by consuming the electric power in the main circuit which is an object to be discharged in the discharge control, and consequently, the main circuit voltage can be quickly reduced.

(4) In this case, it is preferable that the sub-electric power supply device include an electricity storage element (for instance, the later-described backup capacitor C3) connected to an electric power supply line which connects the main power supply and the control device. While electric power can be supplied from the main power supply to the control device, the electricity storage element connected to the electric power supply line in this manner is always fully charged with the electric power supplied from the main power supply. Thus, as described above, after the first discharge control is performed, the period of monitoring by the monitor can be increased.

(5) In this case, it is preferable that while the main circuit voltage is monitored by the monitor, power consumption of the control device is set lower than power consumption while the main circuit voltage is not monitored by the monitor. As described above, when the vehicle is in collision, electric power may not be supplied from the main power supply to the control device. In that case, electric power is supplied from the sub-electric power supply device to the control device, but the electric power supplied from the sub-electric power supply device to the control device has a limit. However, by setting the power consumption of the control device in the above-described manner in the power supply system of the present disclosure, after termination of the first discharge control, the period in which electric power can be supplied from the sub-electric power supply device to the control device can be increased, thus, the main circuit voltage can be monitored for a longer period.

(6) In this case, it is preferable that the power supply system for a vehicle further include a resolver that detects a rotational angle of the electric power generator, and while the main circuit voltage is monitored by the monitor, supply of electric power to the resolver be stopped or reduced. Consequently, after termination of the first discharge control, the period in which electric power can be supplied from the sub-electric power supply device to the control device can be increased, thus the main circuit voltage can be monitored for a longer period.

(7) In this case, it is preferable that the main circuit include an electric power converter that converts electric power between the main circuit and the electric power generator, and a voltage converter that converts a voltage between the electricity storage device and the electric power converter; the control device include a microcomputer, and a drive circuit that drives the electric power converter and the voltage converter in response to a command from the microcomputer; and while the main circuit voltage is monitored by the monitor, supply of electric power to a circuit involved in driving of at least the voltage converter of the drive circuit be stopped or reduced. Consequently, after termination of the first discharge control, the period in which electric power can be supplied from the sub-electric power supply device to the control device can be increased, thus the main circuit voltage can be monitored for a longer period.

(8) In this case, it is preferable that while the main circuit voltage is monitored by the monitor, a control period of the microcomputer be set longer than a control period of the microcomputer while the main circuit voltage is not monitored by the monitor. Consequently, the power consumption of the microcomputer can be reduced, and after termination of the first discharge control, the period in which electric power can be supplied from the sub-electric power supply device to the control device can be increased, thus the main circuit voltage can be monitored for a longer period.

(9) In this case, it is preferable that the main circuit further include a DCDC converter that steps down electric power in the main circuit and supplies the decreased electric power to the main power supply; the control device include a control circuit that drives the DCDC converter; and while the main circuit voltage is monitored by the monitor, supply of electric power to the control circuit be stopped. Consequently, the power consumption of the control device can be reduced, and after termination of the first discharge control, the period in which electric power can be supplied from the sub-electric power supply device to the control device can be increased, thus the main circuit voltage can be monitored for a longer period.

DETAILED DESCRIPTION OF THE EMBODIMENTS OF THE INVENTION

Figure 1:
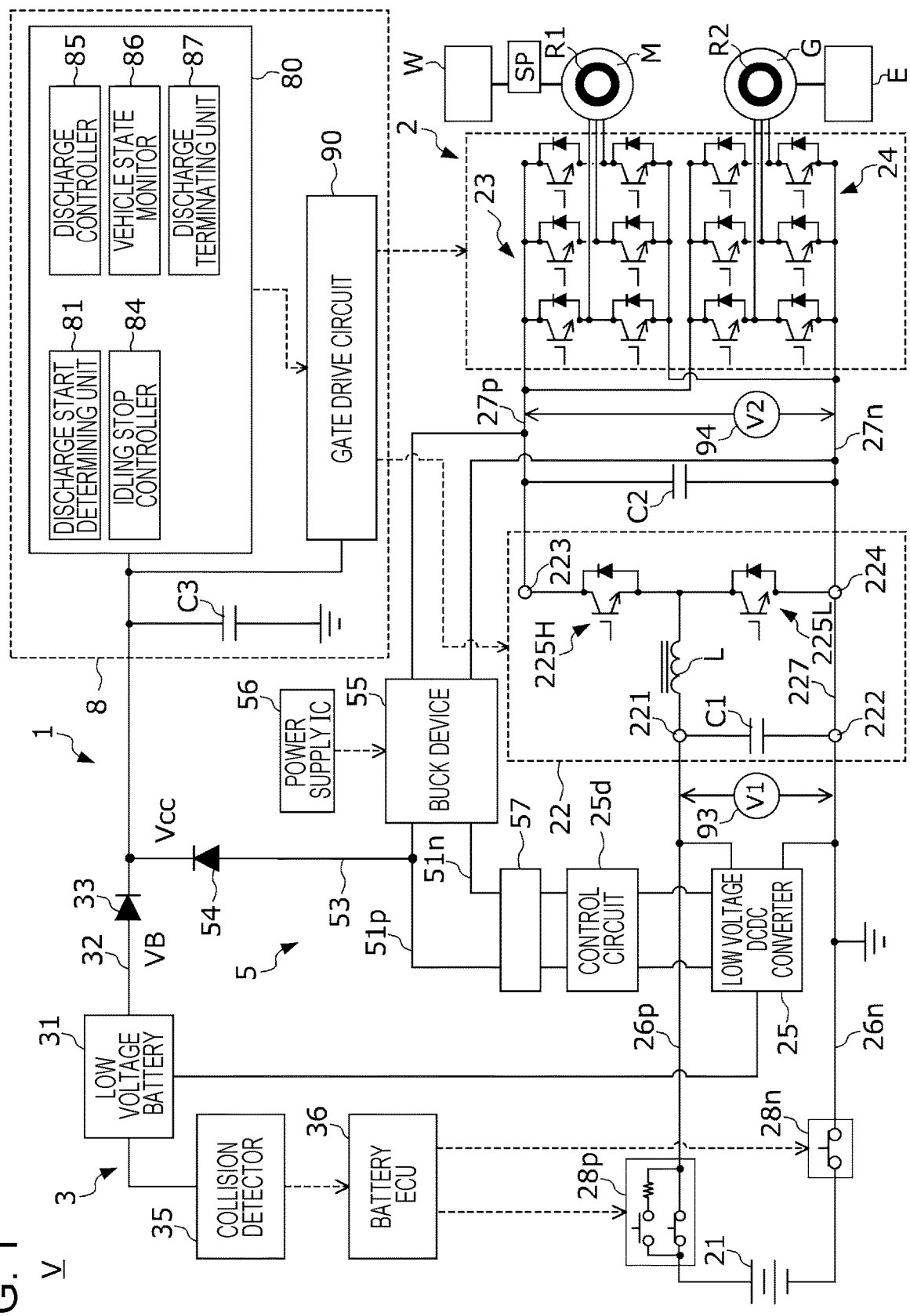
FIG. 1 is a diagram illustrating the configuration of an electric vehicle equipped with a power supply system according to an embodiment of the present disclosure.

Hereinafter an embodiment of the present disclosure will be described with reference to the drawings. FIG. 1 is a diagram illustrating the configuration of an electric vehicle V (hereinafter simply referred to as a "vehicle") equipped with a power supply system 1 according to the embodiment. It is to be noted that although so-called hybrid vehicle including an engine E, a drive motor M, and an electric power generator G will be described as an example in the embodiment, the present disclosure is not limited to this. The power supply system according to the present disclosure is applicable to not only a hybrid vehicle but also any vehicle provided that the vehicle, such as an electric automobile and a fuel cell automobile, which runs using the power stored in a battery.

The vehicle V includes the power supply system 1, the engine E, the drive motor M serving as an electric motor generator, an electric power generator G, drive wheels W, and a vehicle speed sensor SP. The drive motor M mainly generates the power for running the vehicle V. The output shaft of the drive motor M is coupled to the drive wheels W via a power transmission mechanism which is not illustrated. A torque generated in the drive motor M by supplying electric power from the power supply system 1 to the drive motor M is transmitted to the drive wheels W via a power transmission mechanism (not illustrated), rotates the drive wheels W, and causes the vehicle V to run. The drive motor M serves as an electric power generator at the time of deceleration regeneration of the vehicle V. The electric power generated by the drive motor M is stored in the later-described high voltage battery 21 included in the power supply system 1. The vehicle speed sensor SP generates a pulse signal according to the rotational speed of the drive wheels W, in other words, the vehicle speed which is the speed of the vehicle V, and transmits the pulse signal to the later-described system ECU 8.

A first resolver R1 that detects the rotational speed of the output shaft of the drive motor M is mounted on the output shaft. When receiving AC power supplied from the system ECU 8 of the power supply system 1, the first resolver R1 is excited, and transmits a signal according to the rotational angle of the output shaft of the drive motor M to the system ECU 8.

A crankshaft serving as the output shaft of the engine E is coupled to the electric power generator G via a power transmission mechanism which is not illustrated. The electric power generator G is driven by the power of the engine E, and generates electric power. The electric power generated by the electric power generator G is stored in the high voltage battery 21. The engine E is coupled to the drive wheels W via a power transmission mechanism which is not illustrated, and it is also possible to drive the drive wheels W using the power of the engine E.

A second resolver R2 that detects the rotational speed of the output shaft of the electric power generator G is mounted on the output shaft. When receiving AC power supplied from the system ECU 8 of the power supply system 1, the first resolver R2 is excited, and transmits a signal according to the rotational angle of the output shaft of the electric power generator G to the system ECU 8.

The power supply system 1 connects the high voltage battery 21, and the drive motor M, the electric power generator G, and includes a high voltage circuit 2 that transfers electric power between the high voltage battery 21, and the drive motor M, the electric power generator G; a low voltage circuit 3 provided with a low voltage battery 31; a backup power supply unit 5; and the system ECU 8 that controls the drive motor M, the electric power generator G, the high voltage circuit 2, the low voltage circuit 3, and the backup power supply unit 5.

The high voltage circuit 2 includes the high voltage battery 21; a high voltage DCDC converter 22 serving as a voltage converter; first power lines 26$p$, 26$n$ that connect positive/negative electrodes of the high voltage battery 21 to a low voltage-side positive electrode terminal 221 and a low voltage-side negative electrode terminal 222, respectively; a first inverter 23 serving as an electric power converter; a second inverter 24; second power lines 27$p$, 27$n$ that connect a high voltage-side positive electrode terminal 223 and a high voltage-side negative electrode terminal 224 of the high voltage DCDC converter 22 to DC input/output sides of the inverters 23, 24, respectively; a low voltage DCDC converter 25 connected to the first power lines 26$p$, 26$n$; a control circuit 25$d$ for the low voltage DCDC converter 25; and a second smoothing capacitor C2 connected to the second power lines 27$p$, 27$n$.

The high voltage battery 21 is a secondary battery capable of both being discharged to convert chemical energy into electrical energy and being charged to convert electrical energy into chemical energy. Hereinafter a case will be described where so-called lithium-ion rechargeable battery, which performs charging and discharging by moving lithium ions between electrodes, is used as the high voltage battery 21. However, the present disclosure is not limited to this.

The first power lines 26$p$, 26$n$ are provided with a positive electrode contactor 28$p$ and a negative electrode contactor 28$n$, respectively. The contactors 28$p$, 28$n$ are normal open in which in a state where no command signal is inputted from the outside, these contactors 28$p$, 28$n$ are opened to block electrical conduction between both electrodes of the high voltage battery 21 and the first power lines 26$p$, 26$n$, and in a state where a command signal is inputted from the outside, the contactors 28$p$, 28$n$ are closed to connect the high voltage battery 21 and the first power lines 26$p$, 26$n$. The contactors 28$p$, 28$n$ are opened or closed using the electric power supplied from the low voltage battery 31 in response to a command signal transmitted from a battery ECU 6. It is to be noted that the positive electrode contactor 28$p$ is a pre-charge contactor having a pre-charge resistor for relaxing an inrush current into multiple smoothing capacitors provided in the high voltage circuit 2.

The high voltage DCDC converter 22 is provided between the first power lines 26$p$, 26$n$ and the second power lines 27$p$, 27$n$. As described above, the low voltage-side positive electrode terminal 221 and the low voltage-side negative electrode terminal 222 of the high voltage DCDC converter 22 are coupled to the high voltage battery 21 via the first power lines 26$p$, 26$n$, respectively. As described above, the high voltage-side positive electrode terminal 223 and the high voltage-side negative electrode terminal 224 of the high voltage DCDC converter 22 are coupled to the first inverter 23 and the second inverter 24 via the second power lines 27$p$, 27$n$, respectively.

The high voltage DCDC converter 22 is a bidirectional DCDC converter formed by combining a reactor L, a first smoothing capacitor C1, a high-arm device 225H, a low-arm device 225L, and a negative bus bar 227.

The negative bus bar 227 is a wire that connects the low voltage-side negative electrode terminal 222 and the high voltage-side negative electrode terminal 224. The first smoothing capacitor C1 has one end side connected to the low voltage-side positive electrode terminal 221, and the other end side connected to the negative bus bar 227. The reactor L has one end side connected to the low voltage-side positive electrode terminal 221, and the other end side connected to a connection node between the high-arm device 225H and the low-arm device 225L.

The high-arm device 225H includes a known power switching device such as an IGBT and a MOSFET, and a diode connected in parallel to the power switching device. The low-arm device 225L includes a known power switching device such as an IGBT and a MOSFET, and a diode connected in parallel to the power switching device. These high-arm device 225H and low-arm device 225L are connected in that order between the high voltage-side positive electrode terminal 223 and the negative bus bar 227.

The collector of the power switching device of the high-arm device 225H is connected to the high voltage-side positive electrode terminal 223, and the emitter of the power switching device is connected to the collector of the low-arm device 225L. The emitter of the power switching device of the low-arm device 225L is connected to the negative bus bar 227. The forward direction of the diode provided in the high-arm device 225H is the direction from the reactor L toward the high voltage-side positive electrode terminal 223. The forward direction of the diode provided in the low-arm device 225L is the direction from the negative bus bar 227 toward the reactor L.

These high-arm device 225H and low-arm device 225L are each turned on or off by a gate drive signal generated by a gate drive circuit 90 included in the system ECU 8.

The high voltage DCDC converter 22 exhibits a step-up function and a step-down function by performing on/off driving of the devices 225H, 225L in accordance with a gate drive signal generated at a predetermined timing by the gate drive circuit 90 of the system ECU 8. The step-up function is a function of stepping up the voltage applied to the terminals 221, 222 on the low voltage side and outputting the stepped up voltage to the terminals 223, 224 on the high voltage side, and thus a current flows from the first power lines 26p, 26n to the second power lines 27p, 27n. The step-down function is a function of stepping down the voltage applied to the terminals 223, 224 on the high voltage side and outputting the stepped down voltage to the terminals 221, 222 on the low voltage side, and thus a current flows from the second power lines 27p, 27n to the first power lines 26p, 26n. Hereinafter the voltage difference between the first power lines 26p, 26n is referred to as a primary-side voltage V1, and the voltage difference between the second power lines 27p, 27n is referred to as a secondary-side voltage V2.

The first inverter 23 and the second inverter 24 are each a PWM inverter based on pulse width modulation, the PWM inverter including a bridge circuit formed by connecting, for instance, multiple switching devices (for instance, IGBTs) in a bridge form, and having a function of converting between DC power and AC power. The first inverter 23 is connected to the second power lines 27p, 27n on the DC input/output side, and is connected to the coils of U-phase, V-phase, and W-phase of the drive motor M on the AC input/output side.

The second inverter 24 is connected to the second power lines 27p, 27n on the DC input/output side, and is connected to the coils of U-phase, V-phase, and W-phase of the electric power generator G on the AC input/output side.

The first inverter 23 is formed by connecting high-side U-phase switching devices and low-side U-phase switching devices connected to the U-phase of the drive motor M, high-side V-phase switching devices and low-side V-phase switching devices connected to the v-phase of the drive motor M, and high-side W-phase switching devices and low-side W-phase switching devices connected to the W-phase of the drive motor M in a bridge form for each phase.

The first inverter 23 performs on/off driving of the switching devices of each of the phases in accordance with a gate drive signal generated at a predetermined timing by the gate drive circuit 90 of the system ECU 8, thereby converting DC power supplied from the high voltage DCDC converter 22 into AC power to supply the AC power to the drive motor M, and converting AC power supplied from the drive motor M into DC power to supply the DC power to the high voltage DCDC converter 22.

The first inverter 23 is equipped with a chip temperature sensor (not illustrated) that detects the temperature of each switching device and transmits a signal according to a detected value to the system ECU 8.

The second inverter 24 is formed by connecting high-side U-phase switching devices and low-side U-phase switching devices connected to the U-phase of the electric power generator G, high-side V-phase switching devices and low-side V-phase switching devices connected to the v-phase of the electric power generator G, and high-side W-phase switching devices and low-side W-phase switching devices connected to the W-phase of the electric power generator G in a bridge form for each phase.

These first inverter 23 and second inverter 24 are equipped with respective current sensors (not illustrated) that transmit a signal according to a current flowing through each phase of the drive motor M to the system ECU 8. The system ECU 8 can recognize the rotational speed of the output shaft of the drive motor M and the electric power generator G using a signal transmitted from each of these current sensors. Thus, even when the resolvers R1, R2 have a failure, control of the inverters 23, 24 can be continued using a signal transmitted from each of these current sensors.

The second inverter 24 performs on/off driving of the switching devices of each of the phases in accordance with a gate drive signal generated at a predetermined timing by the gate drive circuit 90 of the system ECU 8, thereby converting DC power supplied from the high voltage DCDC converter 22 into AC power to supply the AC power to the electric power generator G, and converting AC power supplied from the electric power generator G into DC power to supply the DC power to the high voltage DCDC converter 22.

The second inverter 24 is equipped with a chip temperature sensor (not illustrated) that detects the temperature of each switching device and transmits a signal according to a detected value to the system ECU 8.

The low voltage DCDC converter 25 is connected to the first power lines 26p, 26n in parallel to the high voltage DCDC converter 22. The control circuit 25d performs on/off driving of the switching devices of the low voltage DCDC converter 25 using the electric power supplied from the backup power supply unit 5, thereby stepping down the voltage V1 between the first power lines 26p, 26n, and supplying the stepped down voltage to the low voltage battery 31 to charge the low voltage battery 31.

The low voltage circuit 3 includes the low voltage battery 31, a first system control power line 32, a first diode 33, a collision detector 35, and a battery ECU 36.

The low voltage battery 31 is a secondary battery capable of both being discharged to convert chemical energy into electrical energy and being charged to convert electrical energy into chemical energy. In the embodiment, a case will be described where a lead battery utilizing lead for the electrodes is used as the battery 31. However, the present disclosure is not limited to this. Hereinafter a case will be described where the low voltage battery 31 having an output voltage lower than the output voltage of the high voltage battery 21 is used. Hereinafter a case will be described where the low voltage battery 31 is provided on the vehicle's front side of the engine chamber (not illustrated) of the vehicle V in consideration of maintenance performance of a user. However, the present disclosure is not limited to this.

The first system control power line 32 is a power supply line that connects the low voltage battery 31 and the system ECU 8, and supplies electric power from the low voltage battery 31 to the system ECU 8. Hereinafter the voltage of the first system control power line 32, in other words, the output voltage of the low voltage battery 31 is denoted by VB.

The first diode 33 is provided in the first system control power line 32. The forward direction of the first diode 33 is the direction from the low voltage battery 31 toward the system ECU 8, and allows a current from the low voltage battery 31 to the system ECU 8.

The collision detector 35 determines whether the vehicle V has collided or is overturned, using a detection signal of an acceleration sensor (not illustrated). When it is determined that vehicle V has collided or is overturned, the collision detector 35 transmits a collision detection signal to the battery ECU 36. The collision detector 35 operates using the electric power supplied from the low voltage battery 31.

The battery ECU 36 is a microcomputer that performs control related to monitoring of on/off of the contactors 28$p$, 28$n$ and the states of the high voltage battery 21 and the low voltage battery 31. The battery ECU 36 operates using the electric power supplied from the low voltage battery 31.

The battery ECU 36 includes a battery sensor unit which is not illustrated. The battery sensor unit includes multiple sensors necessary for estimating the internal state of the high voltage battery 21, such as the voltage, current, and temperature of the high voltage battery 21. The battery ECU 36 estimates the internal state (for instance, a battery temperature and a charge state) of the high voltage battery 21 using a detection signal of the battery sensor unit.

When a start switch is turned on by a driver, the battery ECU 36 is activated using the electric power supplied from the low voltage battery 31, and starts pre-charge of multiple smoothing capacitors C1, C2 provided in the high voltage circuit 2. More specifically, the battery ECU 36 performs pre-charge of the smoothing capacitors C1, C2 by turning on the contactors 28$p$, 28$n$ and connecting the high voltage battery 21 to the first power lines 26$p$, 26$n$. When performing pre-charge of the smoothing capacitors C1, C2, the battery ECU 36 turns on the negative electrode contactor 28$n$, and turns on a contactor having a pre-charge resistor among the positive electrode contactor 28$p$. After pre-charge of the smoothing capacitors C1, C2 is completed, the battery ECU 36 turns on a contactor having no pre-charge resistor among the positive electrode contactor 28$p$. Thus, an inrush current into the smoothing capacitors C1, C2 at the time of execution of pre-charge can be relaxed.

After the battery ECU 36 turns on the contactors 28$p$, 28$n$ as described above, when the start switch is turned off by a driver to stop the power supply system 1 or when a collision detection signal is received from the collision detector 35, the battery ECU 36 turns off the contactors 28$p$, 28$n$ to separate the high voltage battery 21 from the first power lines 26$p$, 26$n$.

The battery ECU 36 is able to perform CAN communication with the system ECU 8 via a CAN bus (not illustrated). Thus, the battery ECU 36 transmits information to the system ECU 8 via the CAN communication, the information being related to the internal state of the high voltage battery 21 estimated by using the battery sensor unit. In addition, while pre-charge of the smoothing capacitors C1, C2 is performed according to the steps as described above, the battery ECU 36 transmits a signal to the system ECU 8 via the CAN communication, the signal indicating that the pre-charge in execution should not be interfered with. When a collision detection signal is received from the collision detector 35, the battery ECU 36 turns off the contactors 28$p$, 28$n$ as described above, and transmits a discharge permission signal to the system ECU 8 via the CAN communication. The discharge permission signal is a signal that permits execution of quick discharge processing (see FIGS. 2A and 2B) described below.

The backup power supply unit 5 includes third power lines 51$p$, 51$n$, a second system control power line 53, a second diode 54, a step-down device 55, a power supply IC 56, and a cut-off switch 57.

The third power lines 51$p$, 51$n$ are each a power supply line that connects the second power lines 27$p$, 27$n$ of the high voltage circuit 2 and the control circuit 25$d$ of the low voltage DCDC converter 25, and supplies electric power to the control circuit 25$d$ from the second power lines 27$p$, 27$n$.

The step-down device 55 is provided in the third power lines 51$p$, 51$n$. The step-down device 55 is an isolated DCDC converter including a transformer and a switching device, the transformer having a primary side connected to the second power line 27$p$ and a secondary-side connected to the control circuit 25$d$, the switching device configured to turn on or off current which flows through the primary side of the transformer. After the start switch is turned on and the contactors 28$p$, 28$n$ are turned on as described above, the power supply IC 56 performs on/off driving of the switching device of the step-down device 55 using the electric power supplied from the first power line 26$p$ (or the second power line 27$p$), thereby stepping down the voltage supplied from the second power line 27$p$ to output the stepped down voltage to the control circuit 25$d$.

The second system control power line 53 is a power supply line that connects a point between the control circuit 25$d$ and the step-down device 55 of the third power line 51$p$ to a point on the first system control power line 32, nearer to the system ECU 8 than the first diode 33, and supplies electric power to the system ECU 8 from the step-down device 55. Hereinafter the voltage of the second system control power line 53, in other words, the output voltage of the step-down device 55 is denoted by Vcc. Hereinafter a case will be described where the second system control power line 53 is connected to the first system control power line 32. However, the present disclosure is not limited to this. The second system control power line 53 may be directly connected to the system ECU 8 not via the first system control power line 32.

The second diode 54 is provided in the second system control power line 53. The forward direction of the second diode 54 is the direction from the step-down device 55 toward the system ECU 8, and allows a current from the step-down device 55 to the system ECU 8.

The cut-off switch 57 is provided between the second system control power line 53 and the control circuit 25*d* of the third power lines 51*p*, 51*n*, and turns on and off the connection between the step-down device 55 and the control circuit 25*d*. The cut-off switch 57 is opened or closed in response to a command signal transmitted from the system ECU 8. When the start switch is turned on by a driver, the system ECU 8 closes the cut-off switch 57 to connect the step-down device 55 and the control circuit 25*d*. In addition, at the time of execution of vehicle state monitoring processing described later with reference to FIG. 10, the system ECU 8 opens the cut-off switch 57 to disconnect the step-down device 55 from the control circuit 25*d*.

Here, the setting of the output voltage Vcc of the step-down device 55 will be described. As illustrated in FIG. 1, the system ECU 8, which performs drive control of the vehicle V, is connected to the low voltage battery 31 and the step-down device 55 serving as electric power supply sources via the diodes 33 and 54, respectively. Thus, it is possible to selectively supply electric power to the system ECU 8 from one of these electric power supply sources, the one having a higher potential. In the embodiment, in order to use the low voltage battery 31 as the main power source for the system ECU 8, and the step-down device 55 as the backup power source for the system ECU 8 in the case where a failure occurs in the low voltage battery 31 (more specifically, in the case where due to a collision of the vehicle V, connection between the low voltage battery 31 and the system ECU 8 is lost or the case where the low voltage battery 31 assumes an abnormal state), and electric power cannot be supplied from the low voltage battery 31 to the system ECU 8, the output voltage Vcc of the step-down device 55 is set within the operational voltage range of the system ECU 8 and lower than an output voltage VB in a state where the low voltage battery 31 is normal. Here, the abnormal state of the low voltage battery 31 refers to a state where the output voltage of the low voltage battery 31 has reduced to a voltage which is significantly lower than that of a new low voltage battery 31 due to excessive deterioration of the low voltage battery 31, for instance.

The system ECU 8 includes a main microcomputer 80 serving as a microcomputer; the gate drive circuit 90 that performs on/off driving of the switching devices of the high voltage DCDC converter 22, the first inverter 23, and the second inverter 24 in response to a command signal transmitted from the main microcomputer 80; a primary-side voltage sensor 93 and a secondary-side voltage sensor 94 that detect a voltage of the high voltage circuit 2; and a backup capacitor C3.

The main microcomputer 80, the gate drive circuit 90, the voltage sensors 93, 94, and the backup capacitor C3 included in the system ECU 8 operate using the electric power supplied from the low voltage battery 31 or the backup power supply unit 5. When the start switch (not illustrated) is turned on by a driver to start the power supply system 1, the system ECU 8 is activated using the electric power supplied from the low voltage battery 31, and subsequently, operates using the electric power supplied from the low voltage battery 31 or the backup power supply unit 5.

The primary-side sensor 93 detects a primary-side voltage V1 which is the potential difference between the first power lines 26*p*, 26*n*, and transmits a signal according to a detected value to the main microcomputer 80. The secondary-side sensor 94 detects a secondary-side voltage V2 which is the potential difference between the second power lines 27*p*, 27*n*, and transmits a signal according to a detected value to the main microcomputer 80.

The backup capacitor C3 is connected, for instance, between the first diode 33 and the main microcomputer 80 of the first system control power line 32. Thus, while the low voltage battery 31 serves as the main power source for the system ECU 8, the backup capacitor C3 is always fully charged with the electric power supplied from the low voltage battery 31. As described above, in the case where electric power cannot be supplied to the system ECU 8 from the low voltage battery 31, the electric power stored in the backup capacitor C3 is consumed by the main microcomputer 80 or the gate drive circuit 90 as needed. Therefore, the backup capacitor C3 serves as the backup power supply for the system ECU 8 along with the backup power supply unit 5.

In the embodiment, a case will be described where the backup capacitor C3 is connected between the first diode 33 and the main microcomputer 80 of the first system control power line 32. However, the present disclosure is not limited to this. The backup capacitor C3 may be connected to a point nearer to the step-down device 55 than the second diode 54 on the second system control power line 53 or between the step-down device 55 and the control circuit 25*d* on the third power line 51*p*. In that case, the backup capacitor C3 can be always fully charged with the electric power supplied from the step-down device 55. Connection of the backup capacitor C3 to such a position enables supply of the electric power stored in the backup capacitor C3 to the control circuit 25*d* in addition to the main microcomputer 80 and the gate drive circuit 90.

The main microcomputer 80 is a microcomputer that performs driving control of the vehicle V, more specifically, comprehensive control of various devices, the drive motor M, and the electric power generator G included in the high voltage circuit 2. Among the modules implemented by the main microcomputer 80, FIG. 1 illustrates only those modules that are in charge of execution of discharge processing illustrated in FIGS. 2A and 2B. Here, the discharge processing refers to a series of processing that determines whether some abnormality, such as a collision, has occurred, and when an abnormality is determined to have occurred, discharges the electric power stored in the smoothing capacitor C3 of the high voltage circuit 2 which has a high voltage.

The main microcomputer 80 includes, as the modules in charge of execution of the later-described discharge processing in FIGS. 2A and 2B, a discharge start determining unit 81 in charge of execution of the later-described charge start determination processing (see S2), an idling stop controller 84 in charge of execution of the later-described idling stop control processing (see S6), a discharge controller 85 in charge of execution of the later-described discharge control processing (see S9), a vehicle state monitor 86 in charge of the later-described vehicle state monitoring processing (see S12), and a discharge terminating unit 87 in charge of execution of the later-described discharge termination processing (see S14).

Figure 2A:
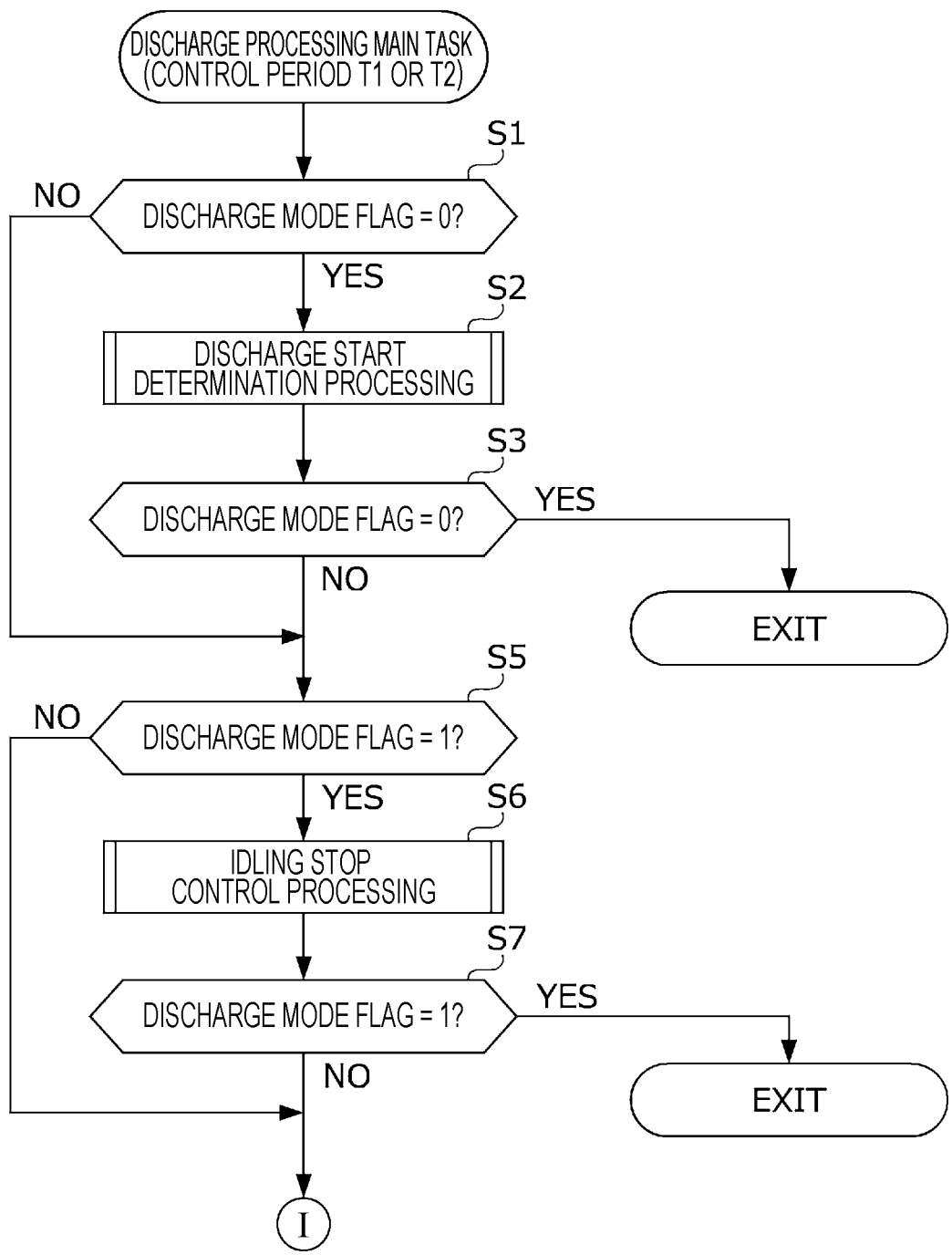
FIG. 2A is a flowchart (part one) illustrating the specific steps of the main task of discharge processing.
Figure 2B:
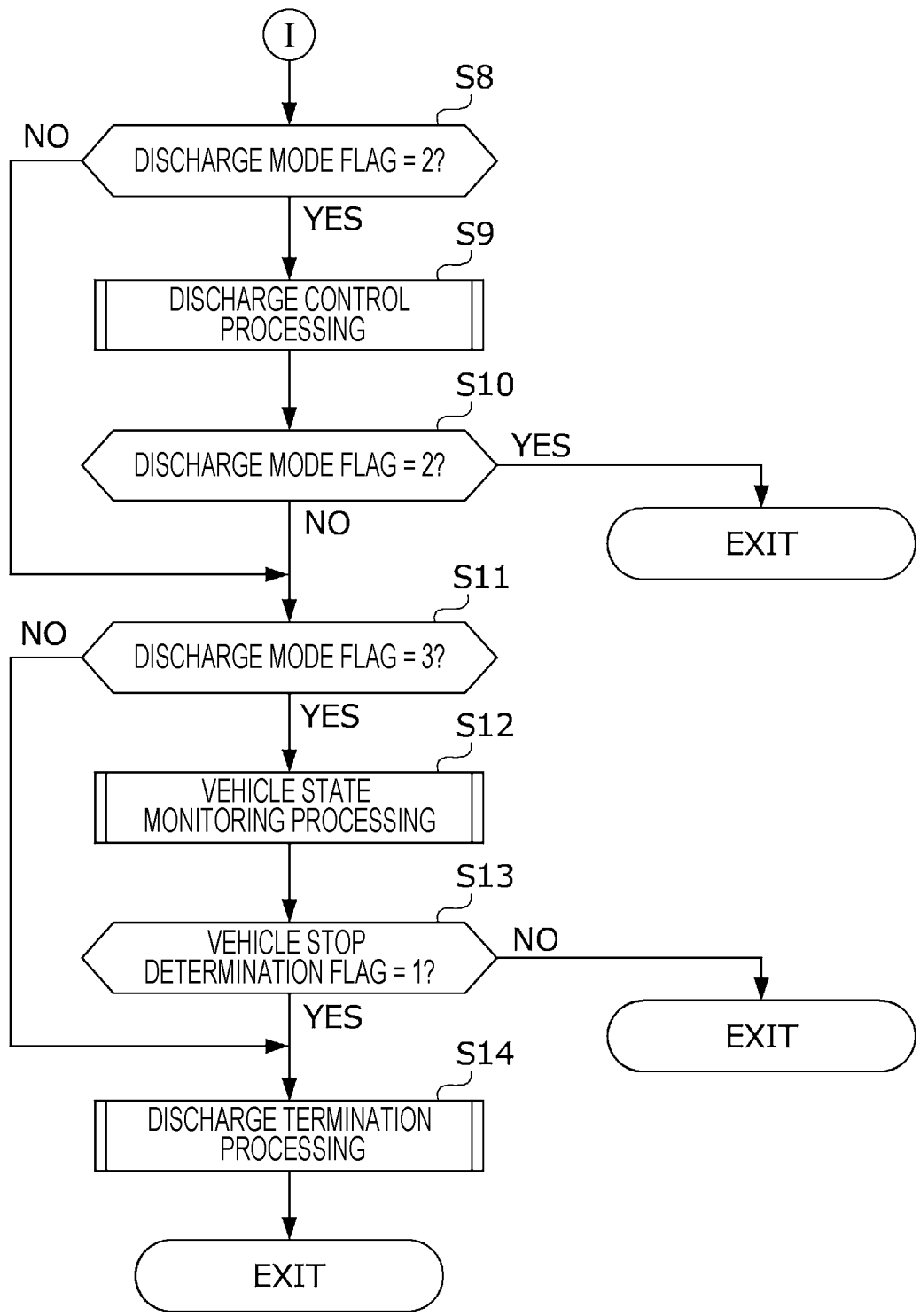
FIG. 2B is a flowchart (part two) illustrating the specific steps of the main task of discharge processing.

FIGS. 2A and 2B are each a flowchart illustrating the specific steps of the main task of the discharge processing in the system ECU 8. The discharge processing illustrated in FIGS. 2A and 2B is repeatedly executed with a predetermined control period in the system ECU 8 while the vehicle V is in operation. The main microcomputer 80 of the system ECU 8 can switch the control period of the main task between a normal period T1 and a power-saving period T2 which is longer than the normal period T1. When the value of a discharge mode flag is not "3", in other words, when the state of the vehicle is not monitored by the vehicle state monitor 86, the main microcomputer 80 sets the control period of the main task to the normal period T1, and when the value of the discharge mode flag is "3", in other words, when the state of the vehicle is monitored by the vehicle state monitor 86, the main microcomputer 80 sets the control period of the main task to the power-saving period T2 (see S61 of FIG. 6 described later).

Hereinafter before the specific steps of the flowchart are described in detail, various flags defined in the system ECU 8 and what is indicated by their values will be described.

In the system ECU 8, the discharge mode flag and the vehicle stop determination flag are defined.

The discharge mode flag may take a value which is one of 0, 1, 2, 3, and 4. The discharge mode flag is a flag that indicates a progression stage of the main task. The discharge mode flag of "0" indicates that the later-described discharge start condition is not met. The discharge mode flag of "1" indicates that after the discharge start condition is met, the later-described idling stop control processing is in execution. The discharge mode flag of "2" indicates that after the discharge start condition is met, the later-described discharge control processing is in execution. The discharge mode flag of "3" indicates that after the discharge start condition is met, the secondary-side voltage has significantly reduced due to execution of the discharge control processing, in other words, the later-described vehicle state monitoring processing is in execution. The discharge mode flag of "4" indicates that after the discharge start condition is met, the vehicle has been determined to be in a stopped state by execution of the vehicle state monitoring processing.

The vehicle stop determination flag may take a value which is one of 0 and 1. The vehicle stop determination flag is a flag that indicates a determination result obtained by the vehicle state monitoring processing. The vehicle stop determination flag of "0" indicates that the vehicle is being monitored or not monitored yet by the vehicle state monitoring processing. The vehicle stop determination flag of "1" indicates that the vehicle is determined to be in a stopped state by the vehicle state monitoring processing.

Figure 3:
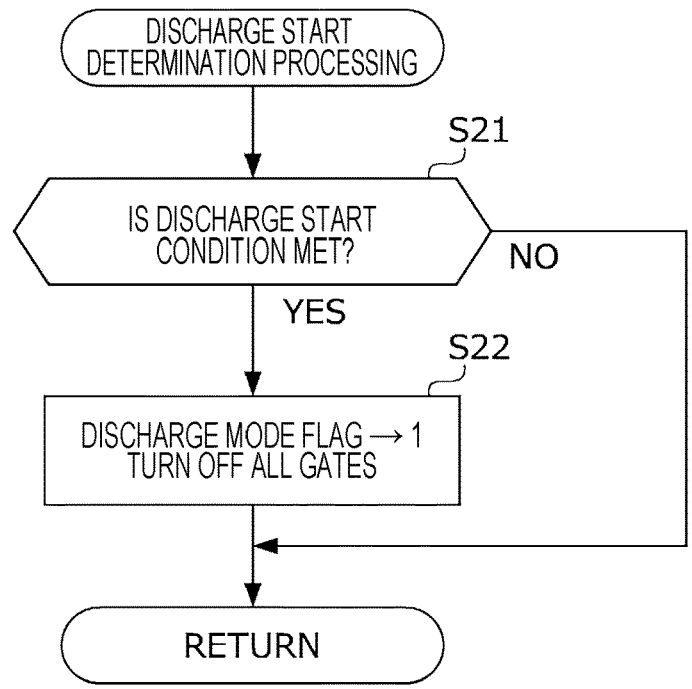
FIG. 3 is a flowchart illustrating the specific steps of discharge start determination processing.

Returning to the main task of FIG. 2A, initially in S1, the discharge start determining unit 81 of the system ECU 8 determines whether the discharge mode flag is "0". When the determination result in S1 is NO, in other words, when the discharge start condition (see S21 of FIG. 3) is already determined to be met in the last or preceding control period, the discharge start determining unit 81 proceeds to S5. When the determination result in S1 is YES, in other words, when the discharge start condition is not met yet, the discharge start determining unit 81 proceeds to S2 to perform discharge start determination processing (see FIG. 3), then proceeds to S3. Referring to FIG. 3, as described in detail later, in the discharge start determination processing, it is determined whether a predetermined discharge start condition is met, and the value of the discharge mode flag is set to "0" or "1" according to a determination result.

FIG. 3 is a flowchart illustrating the specific steps of the discharge start determination processing. Initially in S21, the discharge start determining unit 81 determines whether the discharge start condition is met. The discharge start condition is a condition which may be met when the vehicle is in collision, for instance, the condition that the system ECU 8 receives a discharge permission signal from the battery ECU 36 via the CAN communication. When the determination result in S21 is NO, in other words, when the discharge start condition is not met, the discharge start determining unit 81 completes and terminates the discharge start determination processing of FIG. 3, and proceeds to S3 of FIG. 2A. When the determination result in S21 is YES, in other words, when the discharge start condition is met, the discharge start determining unit 81 proceeds to S22.

In S22, the discharge start determining unit 81 changes the value of the discharge mode flag from "0" to "1", turns off the gates of all switching devices of the first inverter 23, the second inverter 24, and the high voltage DCDC converter 22 to terminate the discharge start determination processing, and proceeds to S3 of FIG. 2A.

Returning to FIG. 2A, in S3, the discharge start determining unit 81 determines whether the value of the discharge mode flag is "0". When the determination result in S3 is YES, in other words, when the discharge start condition is not met, the discharge start determining unit 81 terminates the main task of FIGS. 2A and 2B. When the determination result in S3 is NO, in other words, when the discharge start condition has been met, the discharge start determining unit 81 returns to S5, and quick discharge processing including S5 to S14 is started.

As illustrated in FIGS. 2A and 2B, the quick discharge processing is divided into idling stop control processing (S6), discharge control processing (S9), vehicle state monitoring processing (S12), and discharge termination processing (S14).

Initially in S5, the idling stop controller 84 of the system ECU 8 determines whether the value of the discharge mode flag is "1". When the determination result in S5 is YES, the idling stop controller 84 proceeds to S6 to execute the idling stop control processing, then proceeds to S7. As described later with reference to FIG. 4, the idling stop control processing is such processing that executes idling stop control to reduce or stop the rotation of the drive motor M while suppressing increase in the secondary-side voltage. When the determination result in S5 is NO, in other words, when the idling stop control has been completed, the idling stop controller 84 proceeds to S8 without executing the idling stop control processing in S6.

In S7, the idling stop controller 84 determines whether the value of the discharge mode flag is "1". When the determination result in S7 is YES, in other words, when the idling stop control is in execution, the idling stop controller 84 immediately terminates the main task of FIGS. 2A and 2B without performing the subsequent processing (S8 to S14). When the determination result in S7 is NO, in other words, when the idling stop control has been completed, the idling stop controller 84 proceeds to S8.

Next, in S8, the discharge controller 85 of the system ECU 8 determines whether the value of the discharge mode flag is "2". When the determination result in S8 is YES, the discharge controller 85 proceeds to S9 to execute the discharge control processing, then proceeds to S10. As described later with reference to FIG. 5, the discharge control processing is such processing that executes the discharge control to discharge the electric charges stored in the smoothing capacitors C1, C2 in the high voltage circuit 2. When the determination result in S8 is NO, in other words, when the discharge control processing has been completed, the discharge controller 85 proceeds to S11 without executing the discharge control processing in S9.

In S10, the discharge controller 85 determines whether the value of the discharge mode flag is "2". When the determination result in S10 is YES, in other words, when the discharge control processing is in execution, the discharge controller 85 immediately terminates the main task of FIGS. 2A and 2B without performing the subsequent processing. When the determination result in S10 is NO, in other words, when the discharge control processing has been completed, the discharge controller 85 proceeds to S11.

Next in S11, the vehicle state monitor 86 of the system ECU 8 determines whether the value of the discharge mode flag is "3". When the determination result in S11 is YES, the vehicle state monitor 86 proceeds to S12 to execute the vehicle state monitoring processing, then proceeds to S13. As described later with reference to FIG. 6, the vehicle state monitoring processing is such processing that monitors the state of the vehicle after the discharge control is completed. When the determination result in S11 is NO, in other words, when the vehicle has been determined to be in a stopped state by the vehicle state monitoring processing, the vehicle state monitor 86 proceeds to S14 without executing the vehicle state monitoring processing in S12. In S13, the vehicle state monitor 86 determines whether the value of the discharge mode flag is "1". When the determination result in S13 is NO, in other words, when the vehicle has not been confirmed to be stopped in the vehicle state monitoring processing, the vehicle state monitor 86 terminates the main task of FIGS. 2A and 2B. When the determination result in S13 is YES, the vehicle state monitor 86 proceeds to S14.

Next, in S14, the discharge terminating unit 87 of the system ECU 8 executes the discharge termination processing which will be described later with reference to FIG. 7, then terminates the main task of FIGS. 2A and 2B.

Next, the specific details of the idling stop control processing (S6), the discharge control processing (S9), the vehicle state monitoring processing (S12), and the discharge termination processing (S14) included in the quick discharge processing will be described in that order.

Figure 4:
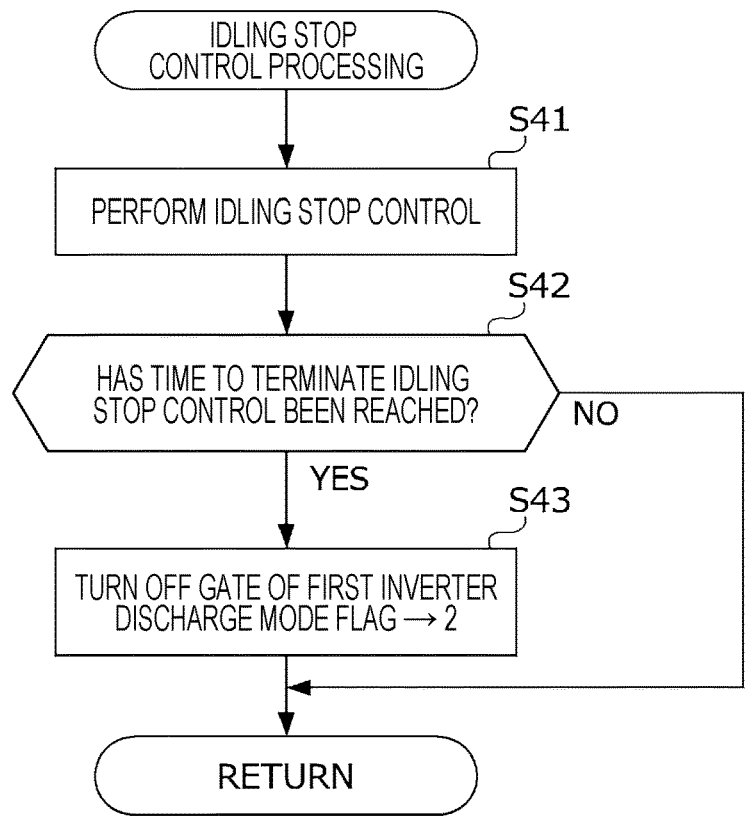
FIG. 4 is a flowchart illustrating the specific steps of idling stop control processing in the main task of FIGS. 2A and 2B.

FIG. 4 is a flowchart illustrating the specific steps of the idling stop control processing (S6) in the main task of FIGS. 2A and 2B. As illustrated in FIG. 2A, the idling stop control processing is executed only when the value of the discharge mode flag is "1". In the idling stop control processing, the idling stop controller 84 reduces or stops the rotation of the drive motor M while suppressing increase in the secondary-side voltage V2.

In S41, the idling stop controller 84 executes the idling stop control, and proceeds to S42. In the idling stop control, the idling stop controller 84 executes a known control technique (for instance, three-phase short circuit control) to reduce the rotational speed of the drive motor M. This makes it possible to reduce the rotational speed of the drive motor M which continues to rotate by inertia of the drive wheels more quickly than to reduce the rotational speed only by friction.

In S42, the idling stop controller 84 determines whether a time to terminate the idling stop control has been reached, more specifically, for instance, whether the number of rotations of the drive motor M has reduced to a predetermined determination number of rotations or less.

When the determination result in S42 is YES, in other words, when a time to terminate the idling stop control has been reached, the idling stop controller 84 proceeds to S43. In S43, the idling stop controller 84 turns off the gates of all switching devices of the first inverter 23, changes the discharge mode flag from "1" to "2" to clearly show that the idling stop control has been completed, and proceeds to S7 of the main task of FIGS. 2A and 2B.

When the determination result in S42 is NO, in other words, when a time to terminate the idling stop control has not been reached, the idling stop controller 84 proceeds to S7 of the main task of FIGS. 2A and 2B while maintaining the value of the discharge mode flag at "1".

Figure 5:
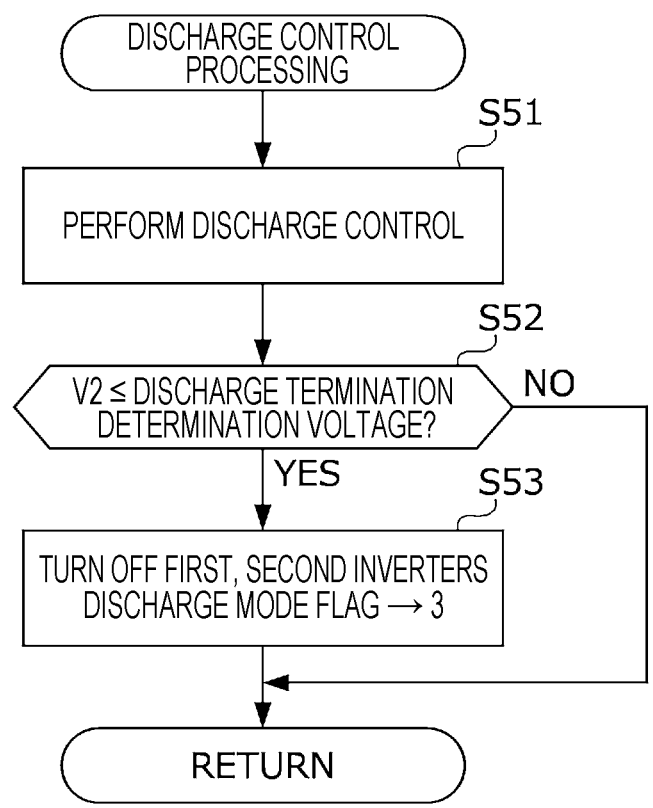
FIG. 5 is a flowchart illustrating the specific steps of discharge control processing in the main task of FIGS. 2A and 2B.

FIG. 5 is a flowchart illustrating the specific steps of the discharge control processing (S9) in the main task of FIGS. 2A and 2B. As illustrated in FIG. 2B, the discharge control processing is executed only when the value of the discharge mode flag is "2". In the discharge control processing, the discharge controller 85 reduces the secondary-side voltage V2 by discharging the electric charges stored in the second smoothing capacitor C2 of the high voltage circuit 2.

Initially in S51, the discharge controller 85 of the system ECU 8 performs the discharge control. In the discharge control, the discharge controller 85 executes a known control technique (for instance, a technique to discharge the electric charges stored in the second smoothing capacitor C2 by switching control of the first inverter 23 and the second inverter 24, or a technique to discharge the electric charges stored in the second smoothing capacitor C2 using a discharge resistor which is not illustrated) to quickly reduce the secondary-side voltage.

In S52, the discharge controller 85 determines whether the secondary-side voltage V2 obtained by utilizing the secondary-side voltage sensor 94 is lower than or equal to the discharge termination determination voltage which is set for the secondary-side voltage to determine a termination time for the discharge control processing. When the determination result in S52 is NO, in other words, when it is determined that the secondary-side voltage V2 has not been sufficiently reduced, the discharge controller 85 proceeds to S10 of the main task of FIGS. 2A and 2B in order to execute the discharge control subsequently for the next control period while maintaining the value of the discharge mode flag at "2". When the determination result in S52 is YES, the discharge controller 85 proceeds to S53.

In S53, the discharge controller 85 turns off the gates of all switching devices of the first inverter 23 and the second inverter 24, then sets the discharge mode flag to "3" to clearly show that the discharge control processing has been completed, and proceeds to S10 of the main task of FIGS. 2A and 2B.

Figure 6:
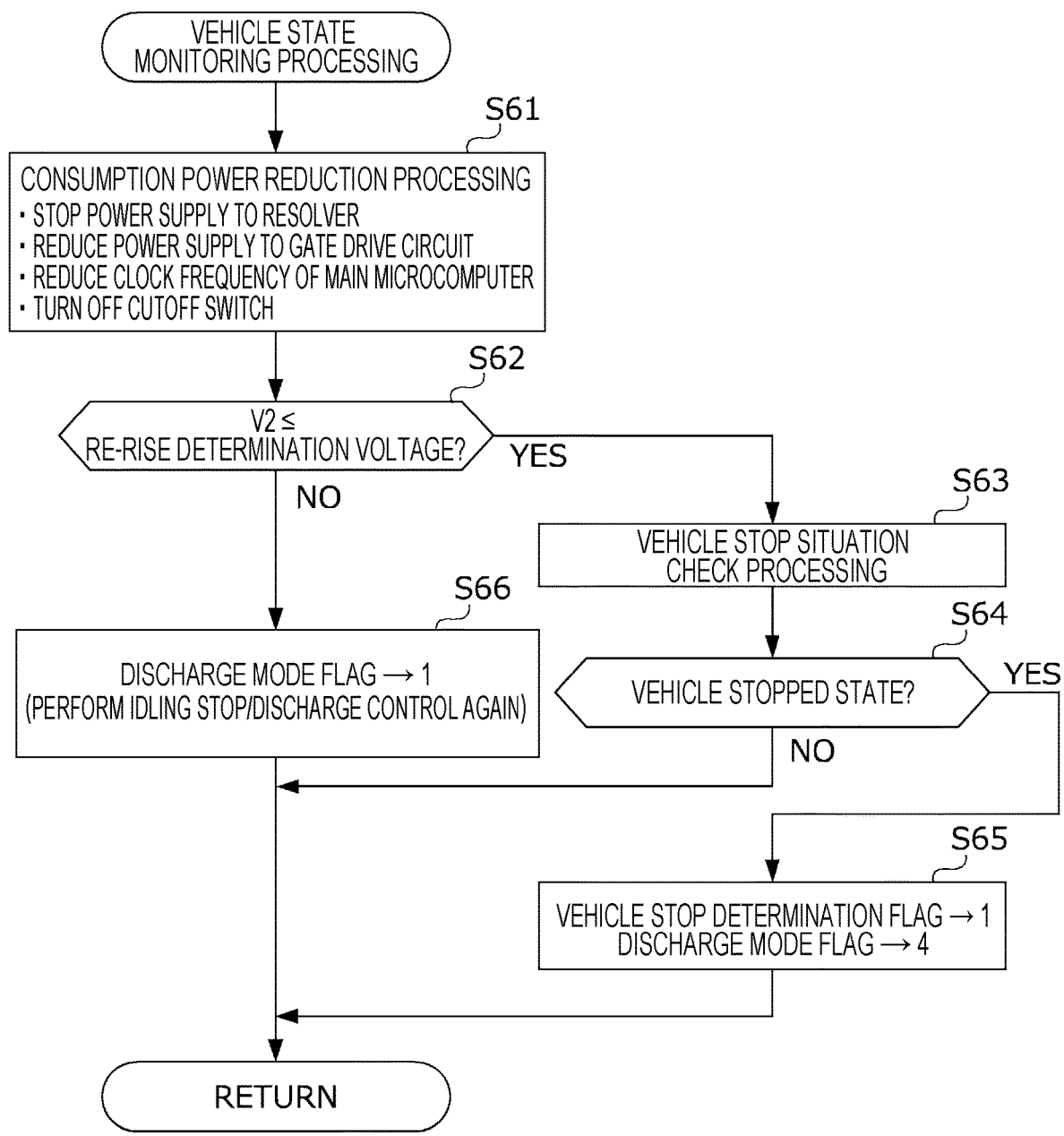
FIG. 6 is a flowchart illustrating the specific steps of vehicle state monitoring processing in the main task of FIGS. 2A and 2B.

FIG. 6 is a flowchart illustrating the specific steps of the vehicle state monitoring processing (see S12) in the main task of FIGS. 2A and 2B. As illustrated in FIG. 2B, the vehicle state monitoring processing is executed only when the value of the discharge mode flag at "3", in other words, only when the secondary-side voltage V2 is determined to be reduced to the discharge termination determination voltage or lower by executing the discharge control by the discharge controller 85. In the vehicle state monitoring processing, the vehicle state monitor 86 determines whether the vehicle V is in a stopped state, and monitors the secondary-side voltage V2 during the monitoring period from termination of the discharge control by the discharge controller 85 until the vehicle V is determined to be in a stopped state.

Initially in S61, the vehicle state monitor 86 executes consumption power reduction processing to suppress sudden reduction of the secondary-side voltage V2, eventually the output voltage Vcc of the step-down device 55 during execution of the vehicle state monitoring processing. More specifically, the vehicle state monitor 86 sets power consumption of the system ECU 8 and the control circuit 25d which are destinations of power supply from the backup power supply unit 5, the power consumption being lower while the secondary-side voltage V2 is monitored than power consumption while the secondary-side voltage V2 is not monitored. More specifically, the vehicle state monitor 86 reduces the power consumption of the system ECU 8 and the control circuit 25d during monitoring period by executing one of the following processing (A) to (D).

(A) While the secondary-side voltage V2 is monitored by the vehicle state monitor 86, an excitement output power supply for exciting the first resolver R1 and the second resolver R2 is stopped. Consequently, supply of electric power from the backup power supply unit 5 to the first resolver R1 and the second resolver R2 is stopped, and thus the power consumption of the system ECU 8 is reduced.

(B) While the secondary-side voltage V2 is monitored by the vehicle state monitor 86, the power consumption of the gate drive circuit 90 is set lower than the power consumption while the secondary-side voltage V2 is not monitored. More specifically, while the secondary-side voltage V2 is monitored by the vehicle state monitor 86, electric power supply to any sub-circuit of the gate drive circuit 90, unnecessary for execution of the idling stop control and the discharge control, in other words, any sub-circuit of the gate drive circuit 90, involved in driving of the high voltage DCDC converter 22 is stopped. Consequently, supply of electric power from the backup power supply unit 5 to the gate drive circuit 90 is reduced, and thus the power consumption of the system ECU 8 is reduced.

(C) While the secondary-side voltage V2 is monitored by the vehicle state monitor 86, the clock frequency of the main microcomputer 80 is set lower than the clock frequency while the secondary-side voltage V2 is not monitored, and the control period of the main task is set to the power-saving period T2 which is longer than the normal period T1. Consequently, the power consumption of the system ECU 8 is reduced.

(D) While the secondary-side voltage V2 is monitored by the vehicle state monitor 86, the cut-off switch 57 is opened to stop supply of electric power from the step-down device 55 of the backup power supply unit 5 to the control circuit 25d of the low voltage DCDC converter 25. Consequently, the power consumption of the control circuit 25d of the low voltage DCDC converter 25 is reduced.

In S62, the vehicle state monitor 86 determines whether the secondary-side voltage V2 obtained by utilizing the secondary-side voltage sensor 94 is the same as the above-mentioned discharge termination determination voltage or lower than or equal to re-rise determination voltage which is set slightly higher than the discharge termination determination voltage. When the determination result in S62 is YES, the vehicle state monitor 86 proceeds to S63.

In S63, the vehicle state monitor 86 executes vehicle stop situation check processing, then proceeds to S64. In the vehicle stop situation check processing, the vehicle state monitor 86 obtains various pieces of information which may be used for determining whether the vehicle is in a stopped state. The various pieces of information which may be used for determining whether the vehicle is in a stopped state include, for instance, information on the vehicle speed obtained by the vehicle speed sensor SP, information on the number of rotations of the engine, information on the number of rotations of the drive motor M, information on the number of rotations of the electric power generator G, information on the operation state of the steering wheel, information on the operation state of the brake, information on the operation state of the accelerator pedal, and information on the operating state of the engine.

In S64, the vehicle state monitor 86 determines whether the vehicle is in a stopped state using the information obtained in S63. When the determination result in S64 is YES, the vehicle state monitor 86 determines that the vehicle is in a stopped state, in other words, there is no possibility of re-rise of the secondary-side voltage V2 which has reduced due to the discharge control, and proceeds to S65. In S65, the vehicle state monitor 86 sets the value of the vehicle stop determination flag to "1" to clearly show that the vehicle is in a stopped state, changes the value of the discharge mode flag from "3" to "4", then proceeds to S14 of the main task of FIGS. 2A and 2B. When the determination result in S64 is NO, in other words, when the vehicle is not in a stopped state, and there is a possibility of subsequent re-rise of the secondary-side voltage V2, the vehicle state monitor 86 proceeds to S14 of the main task of FIGS. 2A and 2B in order to continue subsequent monitoring while maintaining the value of the discharge mode flag at "3".

When the determination result in S62 is NO, the vehicle state monitor 86 proceeds to S66. When the determination result in S62 is NO, the secondary-side voltage V2 is higher than the discharge termination determination voltage and the re-rise determination voltage. In S66, the vehicle state monitor 86 determines that the idling stop control processing and the discharge control processing need to be executed again to reduce the secondary-side voltage which has risen again, sets the discharge mode flag to "1", and proceeds to S14 of the main task of FIGS. 2A and 2B. In the embodiment, the case will be described where when the secondary-side voltage V2 rises again after the discharge control, the idling stop control processing and the discharge control processing are executed. However, the present disclosure is not limited to this. More specifically, when the secondary-side voltage V2 rises again after the discharge control is terminated, the discharge control processing may be resumed without executing the idling stop control processing. In that case, in S66, the vehicle state monitor 86 may set the discharge mode flag to "2".

In the vehicle state monitoring processing of FIG. 6 as described above, the vehicle state monitor 86 determines whether the secondary-side voltage V2 is lower than or equal to the re-rise determination voltage (see S62) during the monitoring period (more specifically, the period since the value of the discharge mode flag is set "3" (see S53 of FIG. 5) until the vehicle is determined to be in a stopped state in S64) since the discharge control is terminated until the vehicle is determined to be in a stopped state. When the secondary-side voltage V2 is determined to be higher than the re-rise determination voltage in the monitoring period, the vehicle state monitor 86 changes the value of the discharge mode flag from "3" back to "1" or "2", and performs the idling stop control and the discharge control again.

Figure 7:
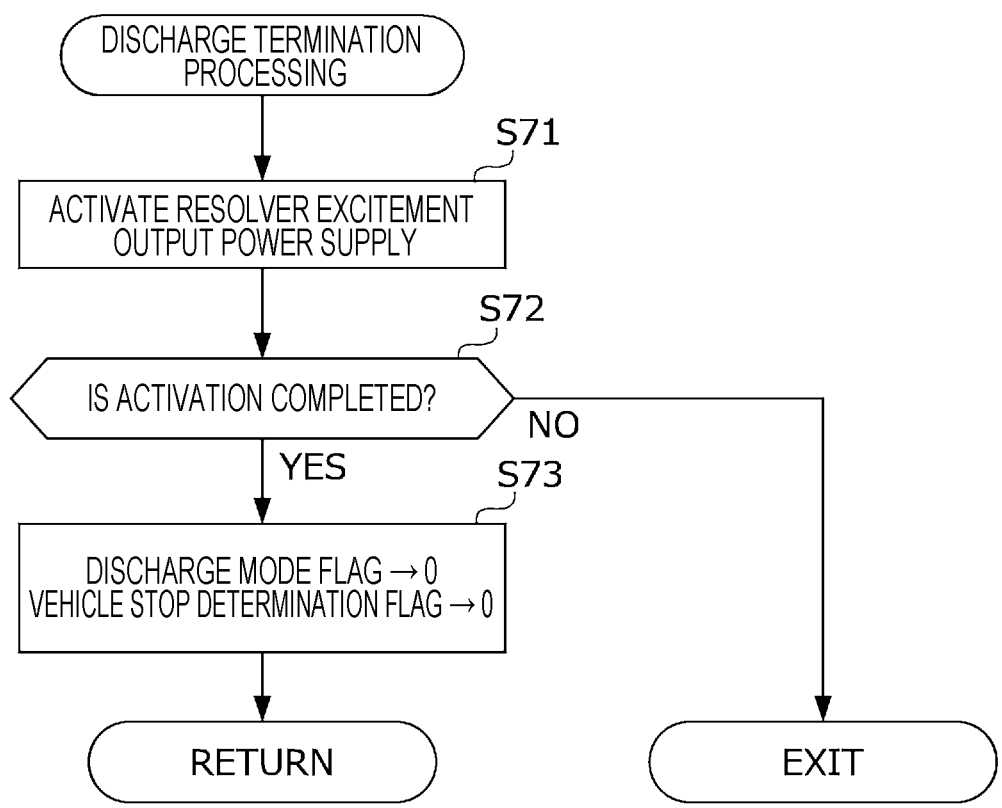
FIG. 7 is a flowchart illustrating the specific steps of discharge termination processing in the main task of FIGS. 2A and 2B.

FIG. 7 is a flowchart illustrating the specific steps of the discharge termination processing (S14) in the main task of FIGS. 2A and 2B. As illustrated in FIG. 2B, the discharge termination processing is executed only when the discharge mode flag is "4" or the vehicle stop determination flag is "1", in other words, only when the vehicle is determined to be in a stopped state in the vehicle state monitoring processing of FIG. 6 (see S64, S65).

Initially in S71, the discharge terminating unit 87 of the system ECU 8 activates an excitement output power supply for exciting the first resolver R1 and the second resolver R2, and proceeds to S72. In S72, the discharge terminating unit 87 determines whether activation of the excitement output power supply for the resolvers R1, R2 is completed. When the determination result in S72 is NO, the discharge terminating unit 87 terminates the main task of FIGS. 2A and 2B to wait for completion of activation of the excitement output power supply. When the determination result in S72 is YES, the discharge terminating unit 87 resets the value of the discharge mode flag and the vehicle stop determination flag to "0", and terminates the discharge termination processing of FIG. 7.

Figure 8:
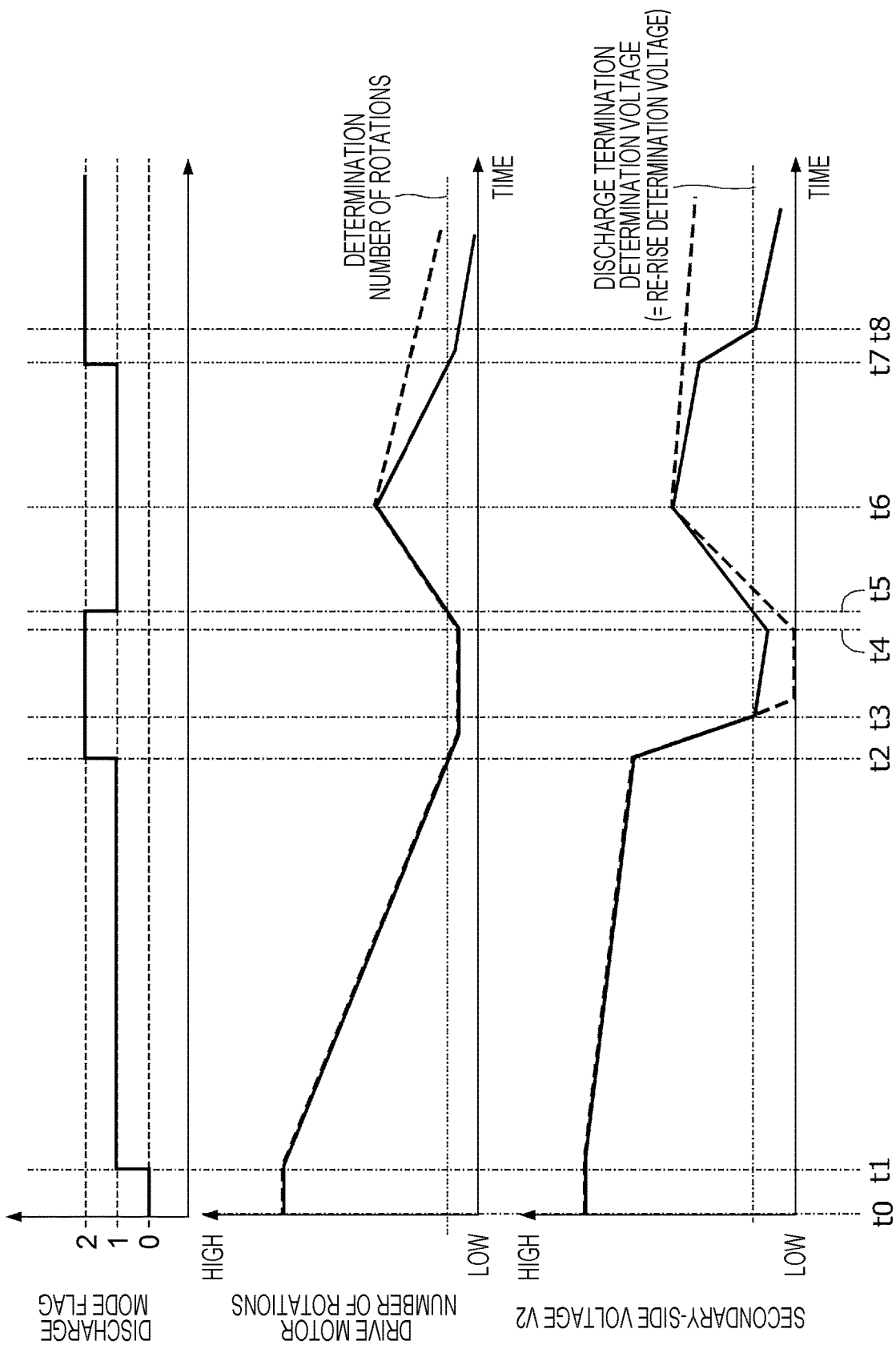
FIG. 8 is a time chart illustrating a specific example of temporal change in the number of rotations of a drive motor and a secondary-side voltage caused by quick discharge processing.

FIG. 8 is a time chart illustrating a specific example of temporal change in the number of rotations of the drive motor M, the secondary-side voltage V2, and the value of the discharge mode flag caused by the quick discharge processing as described above. FIG. 8 illustrates the case where the vehicle V is in collision at time t0. In order to facilitate understanding, FIG. 8 illustrates the case where the re-rise determination voltage (see S62 of FIG. 6), which is a threshold set for the secondary-side voltage V2, is set equal to the discharge termination determination voltage (see S52 of FIG. 5). In FIG. 8, a control example according to the embodiment is illustrated by a solid line, and a comparative example, in which after the discharge control is terminated, the vehicle state monitoring processing is not executed, is illustrated by a dashed line.

Initially at time t1, the discharge terminating unit 87 determines that the discharge start condition is met, thereby sets the discharge mode flag to "1" (see S22 of FIG. 3), and starts the quick discharge processing.

At time t1 and subsequently, the system ECU 8 switches the value of the discharge mode flag to "1", thereby starting the idling stop control processing (see S5 to S7 of FIG. 2A). Thus, the number of rotations of the drive motor M is gradually reduced after time t1. In addition, the electric power stored in the smoothing capacitor C2 is consumed by the backup power supply unit 5, the system ECU 8 that executes the idling stop control processing, and a discharge resistor which is not illustrated, thus the secondary-side voltage C2 is also gradually reduced after time t1.

Subsequently, at time t2, the system ECU 8 determines that the number of rotations of the drive motor M is reduced to a predetermined determination number of rotations or less (see S42 of FIG. 4), and sets the discharge mode flag to "2" (see S43 of FIG. 4).

At time t2 and subsequently, the system ECU 8 switches the value of the discharge mode flag to "2", thereby starting the discharge control processing (see S8 to S10 of FIG. 2B). As illustrated in FIG. 8, the number of rotations of the drive motor M is reduced to the determination number of rotations or less by executing the idling stop control processing during the period between time t1 and time t2, and a significant increase in the inductive voltage caused by the drive motor M may be suppressed. However, the secondary-side voltage V2 still remains high. Meanwhile, the system ECU 8 executes the discharge control to quickly reduce the secondary-side voltage V2 in the discharge control processing after time t2. Consequently, the secondary-side voltage V2 is quickly reduced after time t2.

Subsequently, at time t3, the system ECU 8 determines that the secondary-side voltage V2 is reduced to the discharge termination determination voltage or lower (see S52 of FIG. 5), and sets the value of the discharge mode flag to "3" accordingly (see S53 of FIG. 5).

At time t3 and subsequently, the system ECU 8 switches the value of the discharge mode flag from "2" to "3", and starts the vehicle state monitoring processing in response to termination of the discharge control (see S11 to S13 of FIG. 2B). In the vehicle state monitoring processing, the system ECU 8 monitors whether the secondary-side voltage V2 is maintained at the re-rise determination voltage or lower during the monitoring period from termination of the discharge control until the vehicle V is determined to be in a stopped state (see S62 to S64 of FIG. 6). When the current time is in the monitoring period and the secondary-side voltage V2 is lower than or equal to the re-rise determination voltage, the system ECU 8 executes consumption power reduction processing which is at least one of (A) to (D). Thus, as illustrated in FIG. 8, the reduction rate of the secondary-side voltage V2 becomes lower than the reduction rate during execution of the discharge control, thus the system ECU 8 can monitor re-rise of the secondary-side voltage V2 for a period as long as possible.

Subsequently, at time t4, the vehicle V after a collision starts to roll down on a slope, for instance, then is stopped again at time t6. Thus, during the period between time t4 and time t6, the number of rotations of the drive wheels W and the drive motor M coupled to the drive wheels W is increased, and the secondary-side voltage V2 is increased again due to an inductive voltage which is generated in the drive motor M.

In contrast, in the power supply system in a comparative example illustrated by a dashed line, after the discharge control is terminated at time t3, the state of the vehicle is not monitored. Thus, at time t6 and subsequently, the electric charges stored in the smoothing capacitor C2 are consumed only by a discharge resistor.

In contrast, the system ECU 8 determines that the secondary-side voltage V2 has become higher than the re-rise determination voltage (see S62 of FIG. 6) at time t5 in the period of monitoring by the vehicle state monitoring processing, and changes the value of the discharge mode flag from "3" back to "1". Thus, during the period between time t5 and time t7, the idling stop control processing is executed again, and subsequently, at time t7 and later, the discharge control is executed again, and at time t8 and later, the vehicle state monitoring processing is executed again. Consequently, in the power supply system 1 according to the embodiment, even when the secondary-side voltage V2 rises again in the period after termination of the discharge control until the vehicle assumes a stopped state, the secondary-side voltage V2 can be more quickly reduced than in the comparative example illustrated by a dashed line.

In the power supply system 1 as described above, the following effects are achieved. (1) The system ECU 8 includes the discharge controller 85 that, when the discharge start condition is met, performs discharge control to discharge the electric charges in the smoothing capacitor C2 until the secondary-side voltage V2 is reduced to the discharge termination determination voltage or lower; and the vehicle state monitor 86 that determines whether the vehicle is in a stopped state, and determines whether the secondary-side voltage is lower than or equal to the re-rise determination voltage in the monitoring period from termination of the discharge control until the vehicle is determined to be in a stopped state. In the power supply system 1, even after the secondary-side voltage V2 is reduced to the discharge termination determination voltage or lower by the discharge control, the vehicle state monitor 86 monitors the secondary-side voltage V2 until the vehicle is determined to be in a stopped state, and when rise of the secondary-side voltage V2 is detected in the monitoring period, the discharge controller 85 performs the discharge control again. Thus, when the secondary-side voltage V2 rises again for some reason in the period from the first discharge control at the time of collision until the vehicle assumes a stopped state, the discharge control is performed again accordingly. Consequently, in the power supply system 1, even when the secondary-sided voltage V2 exceeds the re-rise determination voltage in the period from the first discharge control immediately after a collision of the vehicle until the vehicle assumes a stopped state, it is possible to execute the discharge control again.

(2) When the vehicle V is in collision, due to breaking of a power line or a failure of the low voltage battery 31, electric power may not be supplied from the low voltage battery 31 to the system ECU 8. In that case, there is a possibility that sufficient electric power cannot be supplied to the system ECU 8 continuously, the system ECU 8 cannot monitor the secondary-side voltage V2 continuously over a sufficient monitoring period, and when rise of the secondary-side voltage V2 is detected, the discharge control cannot be performed again. In contrast, in the power supply system 1, when electric power cannot be supplied from the low voltage battery 31 to the system ECU 8, electric power is supplied from the high voltage circuit 2, which has a high voltage due to a collision, to the system ECU 8 which has lost electric power via the backup power supply unit 5, thus even after the first discharge control is performed, the secondary-side voltage V2 can be monitored continuously by the vehicle state monitor 86 over the monitoring period. Therefore, in the power supply system 1, when the secondary-side voltage V2 rises again, the discharge control can be performed again, and thus the secondary-side voltage V2 which has risen again can be reduced.

(3) The power supply system 1 includes the backup power supply unit 5 that connects the high voltage circuit 2 and the system ECU 8, and when electric power cannot be supplied from the low voltage battery 31 to the system ECU 8, supplies electric power in the high voltage circuit 2 to the system ECU 8. This enables the system ECU 8 to perform discharge control by consuming electric power in the smoothing capacitor C2 of the high voltage circuit 2, which is an object to be discharged in the discharge control, and therefore, the secondary-side voltage V2 can be quickly reduced to the discharge termination determination voltage.

(4) The system ECU 8 includes the backup capacitor C3 connected to the system control power line 32 that connects the low voltage battery 31 and the main microcomputer 80. The backup capacitor C3 connected to the system control power line 32 in this manner is always fully charged with the electric power supplied from the low voltage battery 31 as long as electric power can be supplied from the low voltage battery 31 to the main microcomputer 80. Thus, as described above, after the secondary-side voltage V2 is reduced to the discharge termination determination voltage or lower, the period of monitoring by the vehicle state monitor 86 can be increased.

(5) As described above, when the vehicle V is in collision, electric power may not be supplied from the low voltage battery 31 to the system ECU 8. In that case, electric power is supplied from the backup power supply unit 5 to the system ECU 8, but the electric power supplied from the backup power supply unit 5 to the system ECU 8 has a limit. In contrast, in the power supply system 1, the power consumption of the system ECU 8 and the control circuit 25$d$ while the secondary-side voltage V2 is monitored by the vehicle state monitor 86 is set lower than the power consumption when the secondary-side voltage V2 is not monitored by the vehicle state monitor 86. Consequently, after termination of the first discharge control, the period in which electric power can be supplied from the backup power supply unit 5 to the system ECU 8 can be increased, thus the secondary-side voltage V2 can be monitored for a longer period.

(6) While monitoring the secondary-side voltage V2, the vehicle state monitor 86 stops or reduces supply of electric power to the resolvers R1, R2 (see consumption power reduction processing (A)). Consequently, after termination of the first discharge control, the period in which electric power can be supplied from the backup power supply unit 5 to the system ECU 8 can be increased, thus the secondary-side voltage V2 can be monitored for a longer period.

(7) While monitoring the secondary-side voltage V2, the vehicle state monitor 86 stops or reduces supply of electric power to any circuit involved in driving of the high voltage DCDC converter 22 which does not need to be driven when the discharge control is performed, the circuit being of the gate drive circuit 90 which drives the high voltage DCDC converter 22 and the inverters 23, 24 in the high voltage circuit 2. Consequently, after termination of the first discharge control, the period in which electric power can be supplied from the backup power supply unit 5 to the system ECU 8 can be increased, thus the secondary-side voltage V2 can be monitored for a longer period.

(8) While monitoring the secondary-side voltage V2, the vehicle state monitor 86 sets a control period of the main task of the main microcomputer 80 longer than a control period while not monitoring the secondary-side voltage V2. Consequently, the power consumption of the main microcomputer 80 can be reduced, and after termination of the first discharge control, the period in which electric power can be supplied from the backup power supply unit 5 to the system ECU 8 can be increased, thus the secondary-side voltage V2 can be monitored for a longer period.

(9) While monitoring the secondary-side voltage V2, the vehicle state monitor 86 stops supply of electric power to the control circuit 25$d$ which drives the low voltage DCDC converter 25. Consequently, the power consumption of the control circuit 25$d$ can be reduced, and after termination of the first discharge control, the period in which electric power can be supplied from the backup power supply unit 5 to the system ECU 8 can be increased, thus the secondary-side voltage V2 can be monitored for a longer period.

Although an embodiment of the present disclosure has been described above, the present disclosure is not limited to this. A detail of the configuration may be modified as needed within the scope of the spirit of the present disclosure. For instance, in the above-described embodiment, the case has been described where when the discharge start condition is met, the idling stop control is first started, then the discharge control starts after the idling stop control is terminated. However, the order of execution of the idling stop control and the discharge control is not limited to this. For instance, the idling stop control and the discharge control may be executed concurrently, or after the idling stop control is started, the discharge control may be started before the idling stop control is terminated.

What is claimed is:
1. A power supply system for a vehicle, comprising:
an electricity storage device;
an electric power generator coupled to drive wheels of the vehicle;
a main circuit electrically connecting the electricity storage device and the electric power generator and configured to transfer electric power between the electricity storage device and the electric power generator;
a main circuit voltage sensor configured to detect a main circuit voltage which is a voltage of the main circuit;
a collision detector configured to detect whether the vehicle is in collision;

a control device configured to control the electric power generator and the main circuit and comprising a discharge controller capable of performing first discharge control and second discharge control, when the collision detector detects that the vehicle is in the collision, by discharging electric charges in the main circuit so as to reduce the main circuit voltage; and a main power supply configured to supply electric power to the control device, wherein the control device further comprises a monitor configured to determine whether the vehicle is in a stopped state and to monitor the main circuit voltage during a monitoring period that is from termination of the first discharge control until the vehicle is determined to be in the stopped state, and wherein the control device is configured such that the discharge controller starts the first discharge control when the collision detector detects that the vehicle is in the collision and starts the second discharge control when the monitor detects rise of the main circuit voltage during the monitoring period.

2. The power supply system according to claim 1, further comprising a sub-electric power supply device configured to, when the electric power is unable to be supplied from the main power supply to the control device, supply the electric power to the control device.

3. The power supply system according to claim 2, wherein the sub-electric power supply device comprises a sub-power supply circuit that connects the main circuit and the control device and is configured to supply the electric power in the main circuit to the control device when the electric power is unable to be supplied from the main power supply to the control device.

4. The power supply system according to claim 2, wherein the sub-electric power supply device comprises an electricity storage element connected to an electric power supply line which connects the main power supply and the control device.

5. The power supply system according to claim 2, wherein when the main circuit voltage is being monitored by the monitor, the power supply system sets power consumption of the control device to be lower than the power consumption which is set when the main circuit voltage is not monitored by the monitor.

6. The power supply system according to claim 2, further comprising a resolver configured to detect a rotational angle of the electric power generator, wherein when the main circuit voltage is being monitored by the monitor, the supply of electric power to the resolver is stopped or reduced.

7. The power supply system according to claim 2, wherein the main circuit comprises an electric power converter configured to convert the electric power between the main circuit and the electric power generator, and a voltage converter configured to convert a voltage between the electricity storage device and the electric power converter, the control device comprises a microcomputer, and a drive circuit configured to drive the electric power converter and the voltage converter in response to a command from the microcomputer, and when the main circuit voltage is being monitored by the monitor, the supply of the electric power to a circuit for driving of at least the voltage converter of the drive circuit is stopped or reduced.

8. The power supply system according to claim 7, wherein when the main circuit voltage is being monitored by the monitor, the power supply system sets a control period of the microcomputer to be longer than the control period of the microcomputer which is set when the main circuit voltage is not monitored by the monitor.

9. The power supply system according to claim 2, wherein the main circuit further comprises a DCDC converter configured to step down the electric power in the main circuit and supply the stepped down electric power to the main power supply, the control device further comprises a control circuit configured to drive the DCDC converter, and when the main circuit voltage is being monitored by the monitor, the supply of electric power to the control circuit is stopped.

10. A power supply system for a vehicle, comprising:

an electricity storage device;

an electric power generator coupled to drive wheels of the vehicle;

a main circuit electrically connecting the electricity storage device and the electric power generator and configured to transfer electric power between the electricity storage device and the electric power generator;

a main circuit voltage sensor configured to detect a main circuit voltage which is a voltage of the main circuit;

a control device configured to control the electric power generator and the main circuit and comprising a discharge controller capable of performing first discharge control and second discharge control, when preset discharge start conditions are met by discharging electric charges in the main circuit so as to reduce the main circuit voltage; and a main power supply configured to supply electric power to the control device, wherein the control device is configured to determine whether a number of rotations of the electric power generator is reduced to a predetermined determination number of rotations or less, wherein the control device further comprises a monitor configured to determine whether the vehicle is in a stopped state and to monitor the main circuit voltage during a monitoring period that is from termination of the first discharge control until the vehicle is determined to be in the stopped state on condition that the number of rotations of the electric power generator is reduced to the predetermined determination number of rotations or less, wherein the control device is further configured such that the discharge controller starts the first discharge control when the preset discharge start conditions for the first discharge control are met and starts the second discharge control when the monitor detects rise of the main circuit voltage during the monitoring period.

11. A power supply system for a vehicle, comprising:

an electricity storage device;

an electric power generator coupled to drive wheels of the vehicle;

a main circuit electrically connecting the electricity storage device and the electric power generator and configured to transfer electric power between the electricity storage device and the electric power generator;

a main circuit voltage sensor configured to detect a main circuit voltage which is a voltage of the main circuit;

a control device configured to control the electric power generator and the main circuit and comprising a discharge controller capable of performing first discharge control and second discharge control, when preset discharge start conditions are met by discharging electric charges in the main circuit so as to reduce the main circuit voltage; and a main power supply configured to supply electric power to the control device, wherein the control device further comprises a monitor configured to determine whether the vehicle is in a stopped state and to monitor the main circuit voltage during a monitoring period that is from termination of the first discharge control until the vehicle is determined to be in the stopped state, wherein the control device is configured such that the discharge controller starts the first discharge control when the preset discharge start conditions for the first discharge control are met and starts the second discharge control when the monitor detects rise of the main circuit voltage during the monitoring period and the rise of the main circuit voltage is due to an increase in a number of rotations of the electric power generator.

* * * * *